United States Patent [19]

Frizelle et al.

[11] Patent Number: 5,617,321
[45] Date of Patent: Apr. 1, 1997

[54] METHODS AND APPARATUS FOR THE TESTING, MONITORING AND IMPROVEMENT OF MANUFACTURING PROCESS EFFECTIVENESS

[75] Inventors: Gerald D. M. Frizelle, St. Albans; Robert G. Jackson; Eric J. Woodcock, both of Preston, all of Great Britain

[73] Assignee: Computer Sciences Corporation, El Segundo, Calif.

[21] Appl. No.: 362,263

[22] Filed: Dec. 22, 1994

[30] Foreign Application Priority Data

Dec. 23, 1993 [GB] Great Britain ................ 9326354

[51] Int. Cl.⁶ .................. G06F 19/00; G05B 13/04
[52] U.S. Cl. ................ 364/468.1; 364/151; 395/904
[58] Field of Search .................... 364/148, 149, 364/150, 151, 401, 402, 468.1, 578; 395/54, 904

[56] References Cited

U.S. PATENT DOCUMENTS

| | | | |
|---|---|---|---|
| 4,796,194 | 1/1989 | Atherton | 364/468 |
| 5,077,661 | 12/1991 | Jain et al. | 364/402 |
| 5,140,537 | 8/1992 | Tullis | 364/478 |
| 5,155,679 | 10/1992 | Jain et al. | 364/402 |
| 5,402,367 | 3/1995 | Sullivan et al. | 364/578 |

*Primary Examiner*—Paul P. Gordon
*Attorney, Agent, or Firm*—Donald D. Mon; Daivd O'Reilly

[57] ABSTRACT

Apparatus for optimising the design of a manufacturing process in order to achieve predetermined goals including: A computer simulation model of the structural elements of a manufacturing process pre-programmed to operate according to predetermined flow and sequencing rules and data describing the required product mix and to output, during operation, data on request relating to breakdowns and queues at various resources within the process. A calculator received the data and calculates first values of complexity and constituent elements thereof from the output data of the computer simulation model and second values of complexity and constituent elements thereof from similar data relating to the real manufacturing process in operation. A comparator for receiving and comparing the said first and second values and for selecting improvement data in accordance with the result of that comparison from an improvement rules database and for providing said improvement data to said computer simulation model so as to cause a modification of the model.

5 Claims, 5 Drawing Sheets

Fig.5.

$$H = -\left[ P\log P + (1-P)\log(1-P) \right] + (1-P) \left\{ \sum_i^{M^b} \sum_j^{N^b} P_{ij}^b \log P_{ij}^b + M^q \sum_i^{N^q} \sum_j^q P_{ij}^q \log P_{ij}^q + M^m \sum_i^{N^q} \sum_j^m P_{ij}^m \log P_{ij}^m \right\}$$

CONTROL ELEMENT
(STRUCTURAL COMPLEXITY-
CONTROLLED BY PLANNING)

BREAKDOWN ELEMENT

QUEUING ELEMENT

PRODUCT MIX ELEMENT

RESIDUAL ELEMENT
(OPERATIONAL COMPLEXITY CONTROLLED BY MANAGEMENT)

METHODS AND APPARATUS FOR THE TESTING, MONITORING AND IMPROVEMENT OF MANUFACTURING PROCESS EFFECTIVENESS

The present invention relates to manufacturing processes and in particular to methods and apparatus for the testing, monitoring and improvement of the effectiveness of such manufacturing processes.

The effectiveness of a manufacturing operation is influenced by a number of factors which taken together can be characterised as the complexity of the process. Management's ability to cope with this complexity is a major determinant in how well the operation meets its objectives. The need is therefore for a set of measures that will provide management with the appropriate information with which to decide how and where best to apply their efforts to make these operations more controllable.

The problem surrounding current non financial methods and apparatus for determining such effectiveness and the measures they employ is that the results cannot be aggregated meaningfully. The relationships between these are largely empirical and are gauged in the main by human observation based on experience backed by rules of thumb.

One solution to the problem would be to measure the complexity directly. However, to date, the only area where a well established measure has been developed is in the area of algorithmic complexity. This is concerned with the likely execution times for computer programmes.

Algorithmic complexity is defined as the number of steps or iterations to arrive at a pre-defined goal; or to reach an acceptably close approximation to it.

However the concepts which lie behind algorithmic complexity can equally well be applied to the measurement process that lies at the heart of manufacturing control. In order to obtain an estimate of a particular variable within manufacturing, repeated measurements are required until a satisfactory degree of accuracy has been achieved.

However, there are two reasons why a simple count of the number of observations is an inadequate measure of the complexity of the process.

The first is a mathematical objection which requires a candidate to exhibit certain properties to qualify as a measure, in a mathematical sense. The "number of observations" technique does not fulfil these requirements.

The second is a practical consideration in that the structure of algorithmic complexity does not allow the contribution made by separate factors contributing to the overall complexity of a manufacturing process to be isolated and aggregated.

Thus whilst algorithmic complexity is a useful concept in that it can be applied to the process of measurement within manufacturing, a new measure is required which permits aggregation so as to provide a basis for analysis of typical multi stage manufacturing processes.

It is one objective of the present invention to provide such a new measure.

It is a further objective of the present invention to use the fact that the new measure permits aggregation to devise methods and apparatus which quantitatively determine the effectiveness of any manufacturing process and subsequent changes made to that process.

The new measure or index we propose is derived from the application of measure theory to the concept of algorithmic complexity and has the structure of entropy. It can be expressed by the formula shown in FIG. 5.

A manufacturing process for making one or more products will in general comprise a number of stages. Such stages require the presence of a resource to execute the work. "Resource" in this context means anything which advances the production process, e.g. for converting a product at one stage in its manufacture to a modified form at a subsequent stage in its manufacture. A resource may be a single machine or a whole work centre comprising a number of machines or operations. Each resource may at any time during operation of the process, be in one of a number of states i.e. in a set up (idling and ready to make ), make or broken down (machine malfunction, absent workers, producing reject products or reworking products), state. These states are referred to as "resource states". Additionally, due to the differing speeds of operation of each resource, there may be queues of time varying length at the inputs to each resource.

The resource states along with the queues in front of the resource form a barrier to the progress of parts through the system. The number of barriers (i.e. the number of resources and queues) can be counted and the size of each barrier measured (queue structure plus all the resource states). In this way a complexity index can be derived.

Analysis of the composition of the index reveals that there is a first element that corresponds to the structure of the process and a second element that reflects the operational aspects. Thus the overall complexity of a process is the sum of its structural complexity i.e. those elements which may be controlled by planning, and its residual operational complexity i.e. those elements which require management. Operational complexity may be described by the dynamic relationships between the resource states, queue lengths (bottlenecks) and the product mix i.e. the number of unique products to be made, of all the resources in the process.

The formula shown in FIG. 5 has a structure that allows all the factors affecting the complexity of a manufacturing process to be separately identified.

In the formula all logarithms are taken to the base 2, and:

H is the measure of complexity which we use. H can be considered as the index of complexity referred to above of a manufacturing system S. (It is referred to hereafter as "complexity");

P, which is expressed as a probability, is the proportion of time the system is deemed to be in control in the sense that it is meeting some predetermined objectives over time;

$P^b$ is the probability of being out of control having regard to breakdown states (formally known as Bernoulli States) of the system;

$P^q$ is the probability of being out of control having regard to varying queue lengths in the system;

$P^m$ is the probability of being out of control having regard to the make states of the operation;

M is the total number of resources at the ith resource centre;

$M^b$, $M^q$ and $M^m$ are the number of resources exhibiting breakdown, queue and make states respectively (normally these will each be equal to M);

N is the total number of possible states at the jth resource; and $N^b$, $N^q$ and $N^m$ are the number of breakdown, queue and make states respectively at the jth resource.

The formula assumes the system S to be stationary with respect to time and ergodic and that all states communicate with each other.

As shown in FIG. 5 the formula for complexity exhibits the key elements, i.e. a structural element, which may be controlled with proper planning, a breakdown element, which includes all the factors that prevent a resource from operating as intended, a queuing element and a product mix element. An understanding of the impact of each of these elements, either alone or in combination, on the ability of the process to achieve predetermined goals is the basis upon which the objectives of our invention, as described above, may be realised.

The complexity, H, of a manufacturing system is a measure of that system's success in achieving desired goals, such as producing specified quantities of complex articles in a given time, despite the inherent complexity of the system. The inherent complexity of a manufacturing system, which we refer to hereafter as the "structural complexity", has three basic components i.e. the structure of the article to be produced, the structure of the process to be used to make the article, together forming the structural element of the formula referred to above, and the range of articles to be manufactured (the product mix element of the formula). These components interact and the contributions of each are not easy to separate.

Operational complexity reflects the constantly changing operational environment of the process and is what is observed. It differs from structural complexity in two important ways. Firstly, as we said above operational complexity measures how well the system is coping, while structural complexity only assesses the potential of the manufacturing operation. Secondly, operational complexity includes all the things that can go wrong in the day to day operation, such as breakdowns, reworks, rejects and absenteeism, and it also includes a control element. The control element allows a measurable goal such as schedule adherence or due date performance to alter the structural complexity of the system so as to reduce complexity.

Our measure of complexity, H, and its constituent elements enables apparatus and methods to be implemented by means of which the effects of various control attempts by management on the effectiveness of a manufacturing system in achieving prescribed goals may be quantified and subsequently optimised.

Methods and apparatus according to the invention which determine H allow assessments of such systems to be made which are, as far as possible, independent of subjective observation and interpretation.

According to the present invention in one aspect thereof apparatus for optimising the design of a manufacturing process in order to achieve predetermined goals includes: a computer simulation model of the structural elements of a manufacturing process pre-programmed to operate according to predetermined flow and sequencing rules and data describing the required product mix and to output, during operation, data on request relating to breakdowns and queues at various resources within the process; means for calculating first values of complexity and constituent elements thereof from the output data of the computer simulation model and second values of complexity and constituent elements thereof from similar data relating to the real manufacturing process in operation; and, means for comparing said first and second values and for selecting improvement data in accordance with the result of that comparison from an improvement rules database and for providing said improvement data to said computer simulation model so as to cause a modification of the model.

It will be appreciated that the simulation model, the means for calculating and the means for comparing may be realised in a single multi-tasking computer. The values of complexity and constituent elements thereof may be calculated in accordance with the formula given in FIG. 5 of the accompanying drawings.

The computer simulation model may, for example, be the FACTOR/AIM (registered Trade Mark) manufacturing simulation software supplied by Pritsker Corporation of Indiana USA which allows a user to build an accurate representation of any manufacturing process. A user of AIM may build a model of a process graphically, with symbols to represent machines, operators, conveyors, automatic goods vehicles, fixtures, robots, buffers, shifts, breakdowns, maintenance etc. As the simulation runs, machine states and other parameters may be displayed or transferred to another program, such as the complexity calculation program.

According to the present invention in a further aspect thereof a method of improving the effectiveness of a manufacturing process comprises the steps of:

a) Constructing a simulation model of the manufacturing process, b) collecting relevant structural, operational and control data from the real manufacturing process, c) identifying and quantifying objectives for the process, d) calculating a first value of complexity of the process using the formula at FIG. 5 and the data from step b), e) calculating a second value of complexity of the process using the formula at FIG. 5 and data from the simulation model, f) comparing the difference between said first and second values with a predetermined difference limit. If the difference falls outside the limit, modify the model and repeat steps e) and f). If the difference falls inside the limit carry on with steps g) to 1), g) checking the thus validated model against the quantified objectives set in step c), h) selecting an option from a predetermined hierarchical list of control options or from a list of simplification options, i) modifying the simulation model using the selected options, j) calculating values of complexity and its constituent elements of the modified process using the formula at FIG. 5, k) checking whether the objectives are met, if not carry out step h) with a selection dependent on the results of the calculation at step j), if met go to step 1), l) modifying the real process to accord with the simulation model.

The fundamental premise on which the model and thus the apparatus and methods are based is that the declared operational goals of the manufacturing system can be achieved through a reduction of the impact of unwanted complexity and that any increase in complexity increases the time taken to make a product and the reliability of the process.

Reduction of the impact of unwanted complexity may be achieved by the direct application of operational control so as to change operational complexity or through a simplification of the structure which will change its structural complexity. The methods seek to do both in a systematic way and the apparatus provides the means for doing it.

An embodiment of the invention will now be described by way of a non-limiting example and with reference to the accompanying drawings of which:

FIG. 1 is prepared for operation;

Figure 1:
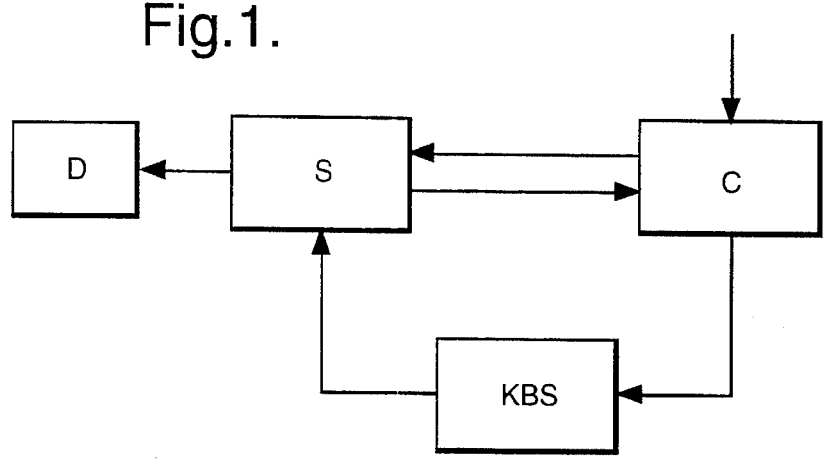
FIG. 1 is a block schematic diagram of essential elements of apparatus for testing, monitoring and improving manufacturing effectiveness.

FIG. 5 as noted above, shows the formula for the index of complexity, H, and its constituent elements which is used by the apparatus of FIG. 1.

Figure 6:
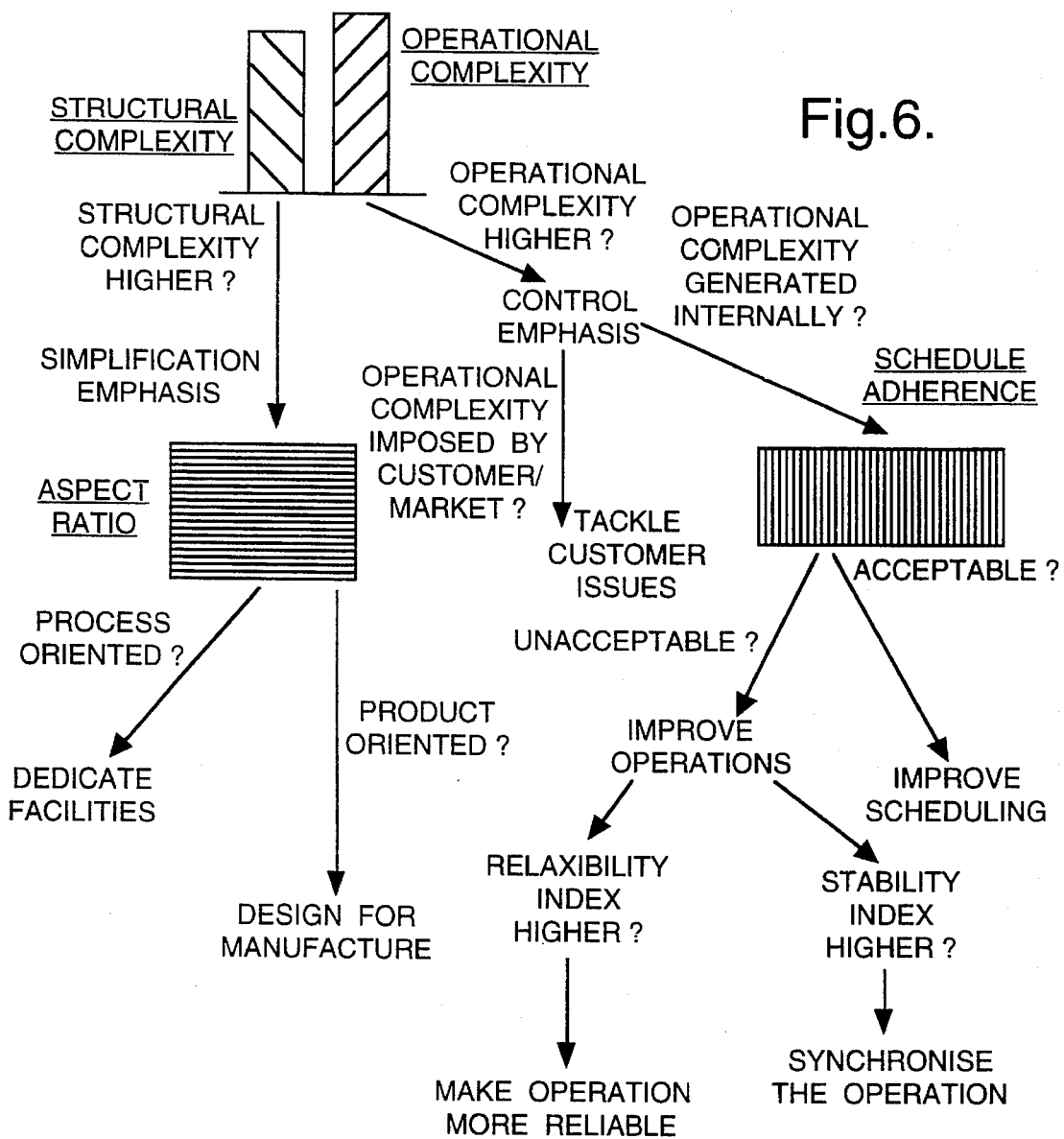

FIG. 6 is a diagram which shows how the structural complexity and operational complexity results, when fed into a knowledge based system, indicate which actions should be taken in order to increase the efficiency of the manufacturing operation.

FIG. 1 shows the essential elements of apparatus according to our invention, for the testing, monitoring and improvement of a manufacturing process (not shown). The apparatus may be regarded as computer aided manufacturing process design, or redesign, equipment and includes a simulation model, S, a complexity calculator, C, and a knowledge based system, KBS.

The simulation model, S, is the AIM manufacturing simulation software, supplied by Pritsker Corporation, set up on a conventional desk top computer to represent a model of the manufacturing process under examination, or a similar simulation model. The model will run in accordance with predetermined flow and sequencing rules built into it by the supplier. A display D associated with the computer may display pictorially the process in operation or data relating to the process.

The complexity calculator, C, is a processor programmed to calculate values of H, and its constituent elements, using the formula of FIG. 5 and data from the simulation model or external sensors (not shown) relating to resource states and queue lengths at each resource point in the modelled or real process respectively.

The knowledge based system KBS is a combined data base and processor containing predetermined rules for improving a process dependent on absolute and relative values of H and its constituent elements. These rules are a consequence of the theoretical analysis that leads to the derivation of the formula in FIG. 5.

The operation of the equipment assumes the AIM software in the simulation model S has been set up previously to represent as appropriately as possible the process under investigation. The complexity calculator C provides a first set of values for H and its constituent elements using data from the sensors monitoring the real process and a second set of values of H and its constituent elements using that data in the simulation model S.

The first and second values of H are compared. If the values differ by more than a predetermined limit the simulation model is adjusted and the calculations and comparisons are repeated. These steps are repeated until the values of H differ by less than the predetermined limit, thus validating the simulation model S as an acceptable representation of the real process.

The KBS then analyses the respective contributions of the constituent elements of the overall complexity H of the real process and selects corresponding rules for changing the process from a look-up table containing rules and H element profiles. This analysis is described in more detail below. The KBS then provides data to change the simulation model in accordance with the selected rules. The simulation model S is then run and its performance is measured by the KBS against predetermined objectives of the process e.g. meeting a specified demand for a number of products in a given time. If the simulated performance is unsatisfactory as determined with reference to the quantified goals and predetermined acceptable variations therein, the KBS recommends further process changes in the simulation model. When simulated performance is acceptable the changes introduced in the simulation model are put into practice in the real process.

The following list is an example of the rules that might be held in the KBS, and are illustrated in FIG. 6;

Rule 1 If structural complexity is greater than operational complexity consider simplifying the process—go to Rule 3

Rule 2 If operational complexity is greater than structural complexity exercise management control of the process—go to Rule 5

Rule 3 If the process is product oriented consider simplifying the design of the product, if not go to Rule 4

Rule 4 If the process is process oriented consider introducing dedicated process facilities.

Rule 5 If the operational complexity is due to market requirements review the process and product mix (go to Rule 3) or tackle customer issues, if not go to Rule 6.

Rule 6 If the operational complexity is generated internally examine schedule adherence and if this is less than a pre-determined limit in, rove operations otherwise in, rove scheduling. Go to Rule 7

Rule 7 If the queue element of the operational complexity exceeds a pre-determined limit then change the means by which the size and contents of queues are managed. Go to Rule 8

Rule 8 Consider the process reliability index and the operational instability index. If the former is greater look at ways of making the process more reliable, if not look at ways of synchronising the activities of resources by better control of the flow.

Figure 2:
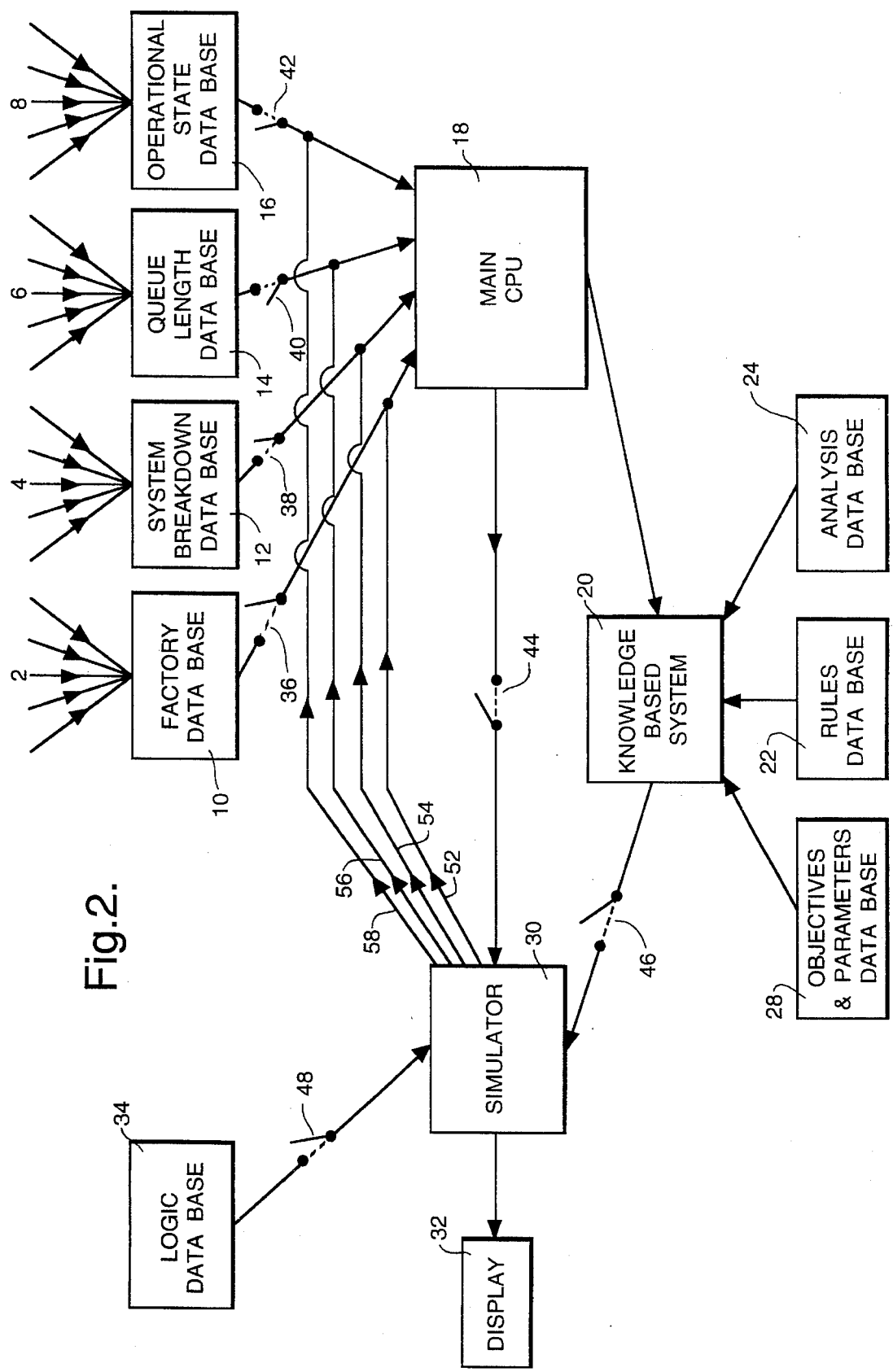
FIG. 2 is a block-schematic diagram of one form of the apparatus for testing, monitoring and improving manufacturing effectiveness shown in FIG. 1 in greater detail.

FIG. 2 is a more detailed example of our invention and shows complexity responsive apparatus interfaced by a series of electronic sensors (not shown) to machines (not shown) employed in a manufacturing plant (not shown). The sensors comprise a plurality of static data sensors, a set of system breakdown sensors, a set of queue length sensors and a set of operational state sensors. The first of these sets of sensors (which may be a simple keyboard device) provides structural data about the factory, whilst the other three sets of sensors provide operational information about the manufacturing operation as it proceeds. The outputs 2, 4, 6 and 8 from the structural data, systems breakdown, queue length and resource state sets of sensors are connected to i) an input of a factory or structural manufacturing database 10 holding all structural manufacturing data such as machine identification, number of processes, components made by each machine, component set-up times and make times, etc., ii) an input of a system breakdown database 12 containing all information relating to machine down times, iii) an input of a queue length database 14 relating to the size and composition of queues, and iv) an input of a resource state database 16 holding all information pertaining to what is being made, or for which product each resource is currently being configured, respectively.

A main Central Processor Unit (CPU) 18 is configured such that it receives inputs from the four databases 10, 12, 14 and 16 via switches 36, 38, 40 and 42 respectively. The main C.P.U. 18 is pre-programmed to calculate, from the value of said inputs, values for the complexity and its constituent elements of processes of the manufacturing plant and to output these values, (expressed as equivalent product processes, EPP's), to an input of a second C.P.U., or computation means, 20 comprising a knowledge based system (KBS).

The KBS 20 is also connected to receive inputs from
i) a rules database 22, containing the rules relating to the methods of obtaining desired objectives e.g. of increasing the efficiency of the said manufacturing process,
ii) an analysis database 24 containing information and methods for analysing the combined inputs to the KBS 20, and
iii) from an objectives and parameters database 28 containing operational improvement criteria.

The data selected from these data bases is dependant on the EPP data received from the main C.P.U. 18 and describes the changes required to improve the efficiency of the said manufacturing process and the procedures for achieving them. An output from the KBS 20 is fed via switch 46 to a simulator 30 connected also to receive inputs via a switch 44 from the main C.P.U. 18 and via a switch 48 from a logic database 34, containing information relating to criteria comprising rules relating to queuing, batching, priorities, and data such as calendar dates and shift patterns required to build a simulation model.

The simulator 30 is additionally connected to a simulation display 32 and via separate outputs 52, 54, 56 and 58 to the switched output lines of the factory database 10, the system breakdown database 12, the queue length database 14 and the operational state database 16 respectively. These simulator outputs, 52, 54, 56 and 58 provide modified inputs to the main C.P.U. 18 to simulate the effects of changes in the manufacturing process criteria stored in the said databases 10, 12, 14 and 16.

The function of the simulator means 30 is to provide a representation or model of the production process using change control commands received from the KBS 20. A comparison of the simulator's outputs inputted to the main C.P.U. 18, enables a quantitative evaluation of the effects of the KBS change commands, and their subsequent modifications on the efficiency of the manufacturing process under consideration.

Figure 3:
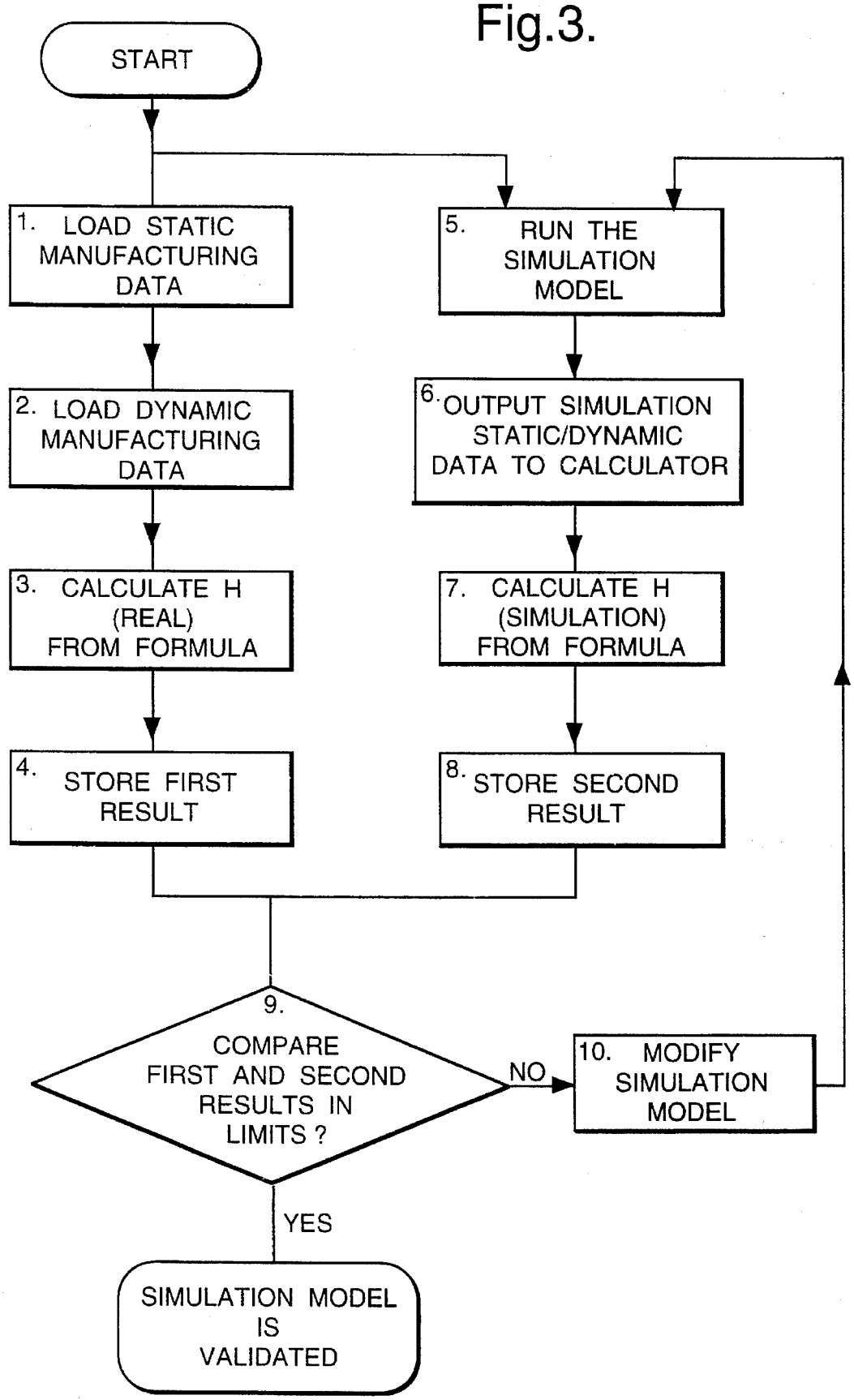
FIG. 3 is a flow chart detailing the logic sequence by which the apparatus
Figure 4:
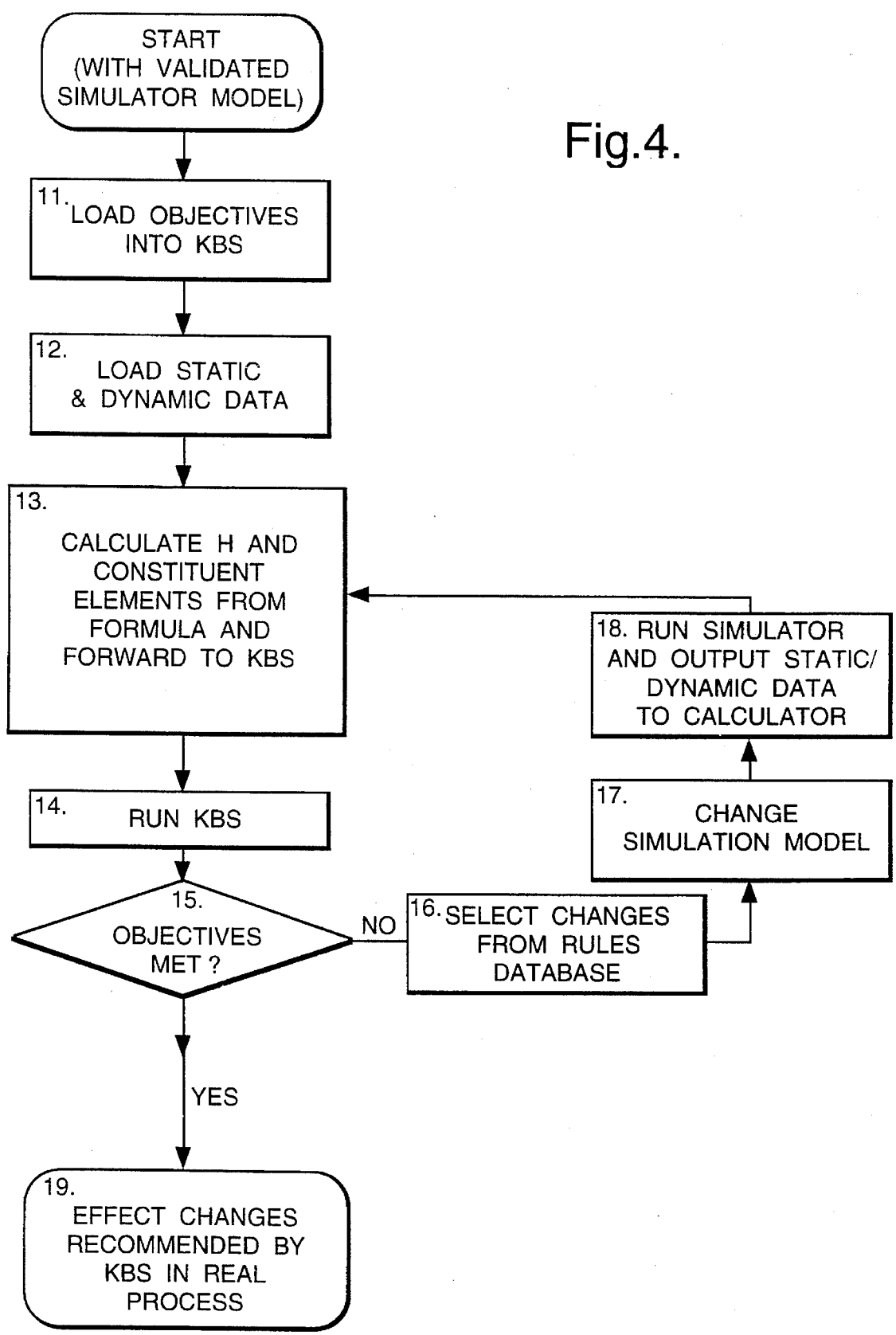
FIG. 4 is a flow chart detailing the logic sequence by which the apparatus of FIG. 1 operates.

The operation of the apparatus of FIG. 1 will now be described and may be followed with the aid of the diagram showing the preparatory validation steps to be taken and the operational flow chart of FIG. 2 and 3 respectively. The simulator 30 is initially set up to represent the manufacturing system to be tested and monitored, as closely as possible. The apparatus is then prepared for operation carrying out the steps shown in FIG. 2 in sequence.

First a validation procedure is followed to ensure that the simulator 30 can accurately represent the manufacturing process under evaluation. To enable this validation process to be conducted, switches 36, 38, 40, 42, 44 are closed, thus enabling data transfer between the respective data bases and the main C.P.U. 18, and switches 46 and 48 are opened thus disconnecting the inputs to the simulator means 30 from the KBS 20 and the logic input database 34

Steps 1 and 2: Structural and operational information from structural data sensors 2 and the sets of machine connected operational data sensors 4, 6 and 8 is assimilated in the corresponding database 10, 12, 14 or 16 and is inputted via corresponding switches 36, 38, and 42 to the main C.P.U. 18.

Step 3: The CPU then runs the program for the calculation of the complexity value, H, of the manufacturing process under consideration, using the formula shown in FIG. 5 attached.

Step 4: This first value of H is stored.

Step 5: The initial data inputted to the main C.P.U. 18 from databases 10, 12, 14 and 16 is then routed via switch 44 to the simulator 30. Switches 36, 38, 40, and 44 are opened, and the simulator 30 then conducts a full simulation of the manufacturing process.

Step 6: The output on lines 52, 54, 56 and 58 of signals representing various simulator produced structural and operational data is routed back to the input of the main C.P.U. 18.

Step 7: CPU 18 again runs the complexity calculation program.

Step 8: A second value of H is stored.

Step 9: A comparison of the values of the second stored value of H, obtained from data from the simulator 30, and the first stored value of H using the real structural and operational data from the databases 10, 12, 14 and 16 is then performed in the main C.P.U. 18. The comparison establishes whether the simulator means 30 represents an effective model of the manufacturing process under evaluation.

Step 10: If the comparison of the two values of H shows them to be dissimilar by more than some predetermined limit, the simulation model is modified and the validation process repeated (Steps 5 to 9) until the values of H agree within the predetermined limit. The simulator is now prepared for operation of the apparatus to optimise the manufacturing process.

Once the evaluation of the simulator 30 has been completed switch 44 is opened and the apparatus is configured for its primary purpose of establishing and modifying the manufacturing complexity of the process under evaluation.

Step 11: Objectives, expressed in terms of complexity indices, are loaded into the Knowledge Based System (KBS) from the database 28.

Step 12: The respective information from factory database 10, system breakdown database 12, queue length database 14 and operational state database 16 is loaded into the main C.P.U. 18 via a route consisting of corresponding closed switches 36, 38, 40 and 42.

Step 13: The information is assimilated within the main C.P.U. 18 enabling the apparatus to calculate values of complexity and its constituent elements from the formula, and output them to the KBS 20 in the format of equivalent product processes or EPP's.

Step 14: The KBS, which has been pre-loaded with inputs from the rules database 22 and the analysis database 24 is run to analyse the process under consideration.

Step 15: The KBS determines from the analysis whether the objectives of the process are met. If they are Step 19 is carried out.

Step 16: The KBS selects process changes using the rules data base and the values of H and its constituent elements and outputs change commands, via closed switch 46, to the simulator means 30. The simulator means 30 receives additional input from the logic database 34.

Step 17 & 18: The simulator 30 changes its model according to the data received from the KBS and conducts a full simulation of the manufacturing process using the information therein and provides an output to a simulator display 32 to enable an operator to visualise the result of the simulation process.

The simulator 30 is also programmed to output information via lines 52, 54, 56 and 58, into the main C.P.U. unit 18, simulating inputs from the databases 10, 12, 14, 16 respectively, whose associated switches 36, 38, 40 and 42 are opened to enable the simulation results to be used for a recalculation of H and its constituent elements and a repeat of Steps 13, 14 and 15.

If the objectives are not met the main C.P.U. 18 again calculates, using the formula of FIG. 5 a value for the complexity and constituent elements of the simulated manufacturing process based on change commands supplied from the KBS 20 and the additional inputs from databases 22, 24, 28 and 34. The result of this complexity calculation in the main C.P.U. 18 is compared in the KBS 20 with a previously stored complexity value required to meet the objectives specified in database 28.

If the required reduction in the complexity of the process has not been achieved, then the information passes once again through the KBS 20 with all its additional inputs and into the simulation phase 30 to enable a simulator output 52, 54, 56 and 58 to be fed back into the main C.P.U. 18 to complete a further iteration in the process. If however the required reduction in manufacturing process complexity has been achieved then the process proceeds to Step 19.

Step 19: The changes recommended by the KBS 20 and displayed by the simulation model 30 on the display 32 are then put into practice in the real manufacturing process.

Many modifications and improvements to the above apparatus and methods described above will now suggest themselves to those skilled in the art for example. whilst the CPU 18, simulator 30 and KBS 20 and associated data bases 22, 24, 28 and 34 are described as separate units, they may be realised in practice in a single desk top computer.

We claim:

1. Apparatus for optimizing the design of a manufacturing process to achieve predetermined goals comprising; a computer simulation model of structural elements of a manufacturing process pre-programmed to operate according to predetermined flow and sequence rules and data describing a required production process; output means providing output data on request during operation relating to breakdowns and queues at various resources within said manufacturing process; calculating means for calculating first values of complexity and consistent elements thereof from the output data of the computer simulation model and second values of complexity and consistent elements thereof from similar data relating to the real manufacturing process in operation; comparing means for comparing said first and second values; selecting means for selecting improvement data in accordance with the result of said comparison in said comparing means from an improvement rules database, said improvement data being provided to said computer simulation model to modify said simulation model according to said improvement data.

2. A method of improving the efficiency of a manufacturing process, comprising the steps of:
   a) constructing a simulation model of a manufacturing process;
   b) collecting relevant static dynamic, and control data from a real manufacturing process;
   c) identifying and quantifying objectives;
   d) calculating a first value of complexity of the process according to the formula for calculating the index of complexity H;

$$H = -\left[ P\log P + (1-P)\log(1-P) + (1-P)\left\{ \sum_i^{M^b} \sum_j^{N^b} P_{ij}^b \log P_{ij}^b + \sum_i^{M^q} \sum_j^{N^q} P_{ij}^q \log P_{ij}^q + \sum_i^{M^m} \sum_j^{N^q} P_{ij}^m \log P_{ij}^m \right\} \right]$$

and said collected data;
   e) calculating a second value of complexity of said manufacturing process according to said formula for calculating the index of complexity H;
   f) comparing the difference between said first and second values of complexity with a predetermined difference limit;
   g) modifying said simulation model according to whether said difference falls outside or inside said predetermined difference limit;
   h) checking a validated simulation model against said identified and quantified objectives;
   i) selecting an option from a predetermined hierarchial list of options;
   j) modifying said simulation model with said selected options;
   k) calculating values of complexity and consistent elements of the modified process simulation model using said formula for calculating the index of complexity H;
   l) checking whether said identified and quantified objectives are met;
   m) modifying said real manufacturing process in accordance with said modified simulation model.

3. The method according to claim 2 comprising continuously repeating said calculation of said second value of complexity of said manufacturing process and, comparing the difference between said first and second values, when said difference falls outside the limit of said predetermined difference limit.

4. The method according to claim 2 comprising continuously repeating said selection of an option from said predetermined hierarchical list of options using the calculated values of complexity and consistent element of the modified process from the formula for calculating the index of complexity H until said objectives are met.

5. The method according to claim 4 wherein said step of selecting an option comprises selecting an option from a list of control options or a list of simplification options.

* * * * *